(12) United States Patent
Zimmer

(10) Patent No.: US 7,399,450 B2
(45) Date of Patent: Jul. 15, 2008

(54) CYCLONE LAYER REACTOR

(76) Inventor: Sebastian Zimmer, Langwiesenweg 42, D-61267 Neu-Anspach (DE)

( * ) Notice: Subject to any disclaimer, the term of this patent is extended or adjusted under 35 U.S.C. 154(b) by 520 days.

(21) Appl. No.: 11/080,547

(22) Filed: Mar. 16, 2005

(65) Prior Publication Data
US 2006/0002829 A1 Jan. 5, 2006

(30) Foreign Application Priority Data
Mar. 16, 2004 (DE) .................... 10 2004 013 019

(51) Int. Cl.
F27B 15/08 (2006.01)
F27B 15/14 (2006.01)
F27B 15/00 (2006.01)
B01J 8/18 (2006.01)
C10G 35/00 (2006.01)

(52) U.S. Cl. ............. 422/147; 208/146; 208/147; 208/148; 208/149; 208/152; 208/155; 208/156; 208/163; 208/164; 208/165; 208/171; 208/176; 422/139; 422/140; 422/141; 422/142; 422/143; 422/144; 422/145; 422/146

(58) Field of Classification Search ......... 208/146–176; 422/139–147
See application file for complete search history.

(56) References Cited

U.S. PATENT DOCUMENTS

| 3,539,293 | A | * | 11/1970 | Boucraut et al. ............. 423/633 |
| 3,887,337 | A | * | 6/1975 | Descamps et al. ............ 422/143 |
| 4,387,667 | A | | 6/1983 | Goodstine et al. |
| 4,511,434 | A | * | 4/1985 | Vasalos ........................ 202/99 |
| 4,518,750 | A | | 5/1985 | Govoni et al. |
| 4,555,328 | A | * | 11/1985 | Krambeck et al. ........... 208/157 |
| 4,966,101 | A | * | 10/1990 | Maeda et al. ................. 122/4 D |
| 5,205,992 | A | * | 4/1993 | van Ommen et al. ......... 422/140 |
| 5,424,043 | A | * | 6/1995 | Martin et al. ................. 422/171 |
| 5,562,818 | A | * | 10/1996 | Hedrick ........................ 208/163 |
| 5,591,411 | A | * | 1/1997 | Terry et al. ................... 422/139 |
| 5,665,949 | A | * | 9/1997 | Fusco et al. .................. 208/161 |
| 5,705,130 | A | * | 1/1998 | Hedrick ........................ 422/145 |
| 6,113,777 | A | * | 9/2000 | Gauthier et al. .............. 208/161 |
| 6,296,812 | B1 | * | 10/2001 | Gauthier et al. .............. 422/144 |
| 6,475,462 | B1 | * | 11/2002 | Dodson et al. ................ 423/659 |
| 2003/0146132 | A1 | * | 8/2003 | Bakker et al. ................. 208/113 |
| 2005/0112037 | A1 | * | 5/2005 | Darling ......................... 422/139 |

FOREIGN PATENT DOCUMENTS

| DE | 15 42 238 B2 | 4/1970 |
| DE | 38 19 584 A1 | 1/1989 |
| DE | 296 224 A5 | 11/1991 |
| DE | 101 04 154 C1 | 7/2002 |
| DE | 10104184 A1 | 8/2002 |
| DE | 101 46 778 A1 | 4/2003 |

* cited by examiner

Primary Examiner—Walter D. Griffin
Assistant Examiner—Huy-Tram Nguyen
(74) Attorney, Agent, or Firm—Crowell & Moring LLP

(57) ABSTRACT

A fluidized-bed reactor is disclosed. The fluidized-bed reactor steadies the gas flow through the fluidized bed chamber of the reactor. The swirl chamber of the reactor consists of a conical housing in which a conical insert is also situated. This creates an annular gap between the housing and the insert, which acts as the swirl chamber and which, according to the geometry of the two components, causes a velocity of the gas flow which remains the same along the height, which increases or which decreases. Such a reactor can also be called a constant annular-gap reactor.

18 Claims, 3 Drawing Sheets

CYCLONE LAYER REACTOR

BACKGROUND AND SUMMARY OF THE INVENTION

The invention relates to a fluidized-bed or cyclone layer reactor having a swirl or cyclone chamber and a gas inlet and a gas outlet.

If required, the gas inlet and the gas outlet are connected with several connection pipes.

During the operation of such a reactor, a so-called fluidized bed forms in the swirl chamber. This is a gas/solids mixture which is in a turbulent state. Because of the turbulences in the fluidized bed, an optimal mixing takes place between the solids, the gases and the liquids charged into the swirl chamber, whereby an optimal substance transfer or adsorption can be achieved.

For different chemical processes, classical fluidized-bed reactors, circulating fluidized-bed reactors or so-called backflowing circulating fluidized-bed reactors are used. A gas usually flows upward through these reactors and, behind the gas inlet, these reactors have a constriction consisting either of a swirl bottom (perforated bottom), a nozzle bottom, an individual nozzle or a multiple nozzle. In the area of the constriction, the gas velocity should be so high that the solids situated above cannot fall through. Above the constriction, the swirl chamber is situated which has a cylindrical or conical construction or a construction which, in sections, is at first conical and then cylindrical. A gas outlet pipe directed to the side is situated above the swirl chamber usually in the side wall of the reactor. Other embodiments provide an upward-oriented, centrically arranged gas outlet pipe.

The disadvantage of the known fluidized-bed reactor constructions essentially consists of the fact that changing gas quantities, which are caused, for example, by systems connected on the input side, frequently result in changes in the fluidized bed which impairs the efficiency of the method and/or lastingly interferes with the operation of the system, for example, connected on the input side.

As countermeasures, gas recirculations (gas returns) are provided, or additional air is admixed to the gas flow, so that the minimal gas quantity flowing through the reactor usually does not fall below 70%-80% of the full-load quantity. Since, on the part of the connecting systems, frequently fluctuations of the gas quantities from 30% to 100% are conceivable or may be desired, considerable energy and equipment expenditures occur for the stabilization of the processes (raising the gas quantity to 70%-80%).

It is therefore an object of the invention to create a fluidized-bed reactor whose fluidized bed can be operated with almost constant parameters (particularly the gas velocity) and can be optimally adjusted by a corresponding dimensioning of the reactor also in the case of different gas quantities (for example, 30%-70%).

According to the invention, the swirl chamber of the reactor 1 consists of a conical or parabolic housing 3 in which an also conical or parabolic insert 4 is situated. This creates an annular gap 2 between the housing 3 and the insert 4, which gap 2 operates as a swirl chamber and, depending on the geometry of the two components, causes a velocity of the gas flow which remains the same along the height, which increases or which decreases. Such a reactor can therefore also be called a constant annular gap reactor.

By lowering or lifting the insert 4 in the direction of the double arrow 5 in the swirl chamber, the gas velocity can be increased or reduced. When the gas quantity which is fed to the reactor changes, the lowering or lifting of the insert can therefore achieve an approximately constant flow velocity in the annular gap 2.

The annular gap 2 can be implemented such that, viewed in the upward direction, the cross-sections of the swirl chamber are enlarged as well as reduced (see FIGS. 1*a* and 1*b* respectively).

As a result of the invention, the previously known high-expenditure countermeasures become superfluous. Furthermore, by means of the invention, stable operating conditions are provided in wide load ranges which normally can be achieved only in the case of constant gas flow rates. The influence on the systems connected on the input and output side by the use of a constant annular gap reactor is minimized.

A fluidized annular-gap reactor is implemented which, as a result of its geometry and inserts according to the invention, permits the optimal development of the operation of swirl bed methods particularly in the case of changeable gas quantities which are guided through the swirl bed reactor, whereby significant negative influences on system parts connected on the input or output side are avoided. In addition, methods are protected which use the constant fluidized-bed reactor according to the invention.

Another problem consists of the fact that, in the case of "backflowing" circulating fluidized beds as well as in the case of fluidized beds which are not operated with a constant gas flow rate, agglomerates form depending on the load range which sink or fall usually along the wall. When the agglomerates arrive in the area of the constriction, they are torn apart by the high gas flow which may result in considerable pressure surges. Particularly in load ranges <70%-80% of the maximal gas quantity, these pressure surges may lead to considerable disturbances of the system operation, whereby a proper operation of the system is prevented.

For solving this problem, the invention provides an agglomerate separator 10 which is constructed as an annular gap opening 11 or by a plurality of offset openings on the circumference of the swirl chamber of a fluidized-bed reactor or as a discharge situated in the center of the reactor.

The openings may be situated in the conical expansion of the swirl chamber, directly at the transition between the conical expansion and the cylindrical part, in the cylindrical part of a conventional fluidized-bed reactor, at an arbitrary point of the nozzle bottom as well as at an arbitrary point of the exterior wall or of the internal cone of an annular gap reactor.

An agglomerate separator is therefore described which optimizes fluidized-bed reactors such that agglomerates can no longer fall to the nozzle bottom inside the swirl chamber but, prior to that, are laterally diverted, for example, into an annular trough, as well as a discharge is described by means of which agglomerates can be withdrawn which many have fallen onto the nozzle bottom. For fluidized bed processes which, in particular, are operated with different loads, the invention leads to more stable operating conditions, and the influence upon the connecting systems is considerably reduced.

It is the function of the agglomerate separator to remove the backflowing agglomerates and conglomerates from the swirl chamber 2. These solids can then be charged into the fluidized bed again by means of regulated or unregulated apportioning devices. FIG. 4 illustrates such an agglomerate separator 10 with an annular gap opening (see ref. no. 11 in FIG. 2). Here, the solids are fed to a floating trough 12 from where they can then be fed again to the fluidized-bed reactor in a regulated manner (control 14), for example, distributed uniformly along the circumference by way of a pipe 13.

By means of the invention, the previously applied expenditures are reduced. Furthermore, by means of the invention, more stable operating conditions are established in wide load ranges which normally can be achieved only in a narrower load range (gas flow rates). The influence upon the systems connected on the input and output side by the use of an agglomerate separator is minimized.

In the case of conventional reactor constructions, the removal of the solids-laden gas takes place centrally upward or laterally in one direction. However, since, as a rule, the gas has a higher core current in this area than at other points in the reactor, so-called roller currents are generated here which lead to a backflow on the wall inside the reactor. In the case of the principle of a centric discharge in the upward direction, this roller flow is uniform. However, a concentration of solids may occur which will then sink along the wall as an agglomerate. In the case of a one-sided lateral discharge, the concentration is partly avoided and the roller formation is also not that pronounced but the gas flow is inhomogeneous and a locally intensified agglomerate formation occurs. The above-mentioned effects are to be avoided by means of the invention. In addition to this invention, the constant annular outlet in connection with a gas guiding cone is protected, which further improves the removal of the gas/solids mixture.

For solving this problem, the invention provides that, by means of outlet openings 30 arranged in a ring-shaped manner (see FIG. 3), which are preferably uniformly distributed on the circumference of the reactor 1, the product-laden gas is discharged in the radial direction and then, as required, in the downward direction. Solids reaching the reactor head in the core current are uniformly (radially) discharged along the shortest path and mainly in all directions. This reduces the formation of agglomerates as well as the size of the forming agglomerates. For fluidized bed processes, which, in particular, are operated with different loads (gas flow rates), the invention results in more stable operating conditions, and the influence upon the connecting systems is considerably reduced.

The constant annular gas outlet may be provided with a gas guiding cone 31 which further improves the removal of the gas/solids mixture.

Other objects, advantages and novel features of the present invention will become apparent from the following detailed description of the invention when considered in conjunction with the accompanying drawings.

DETAILED DESCRIPTION OF THE DRAWINGS

Figure 1B:
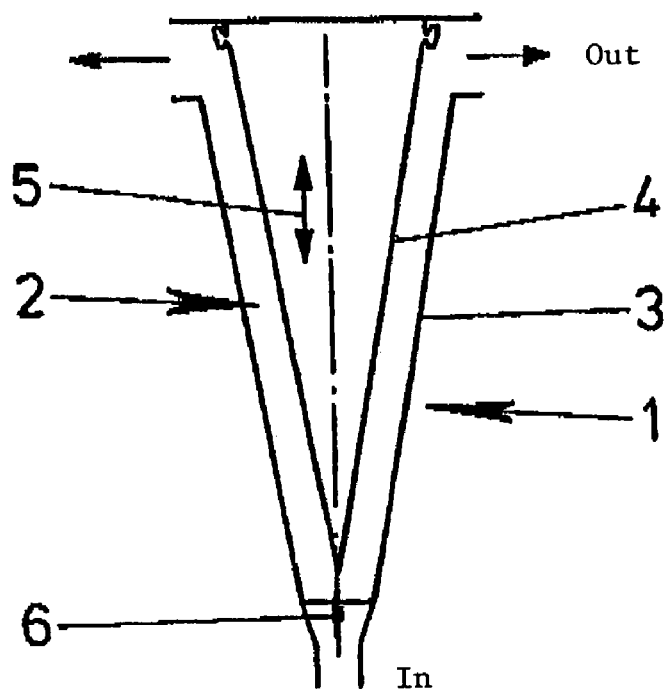
FIGS. 1a, 1b are views of two basic further developments of a fluidized annular-gap reactor according to the invention.

According to FIG. 1, the swirl chamber of a reactor 1 consists of a conical or parabolic housing 3 in which an also conical or parabolic insert 4 is situated. This creates an annular gap 2 between the housing 3 and the insert 4, which gap 2 operates as a swirl chamber and extends along the height of the housing 3 or of the insert 4 respectively and, depending on the geometry of the two components, causes a velocity of the gas flow which remains the same along the height, which increases or which decreases. Such a reactor can therefore also be called a constant annular gap reactor.

By lowering or lifting the insert 4 in the direction of the double arrow 5 by means of an adjusting device, which is not shown in detail, the annular gap geometry is changed and the gas velocity in the swirl chamber is thereby increased or reduced. When the gas quantity which is fed to the reactor changes, the lowering or lifting of the insert 4 can therefore achieve an approximately constant flow velocity in the annular gap 2.

Figure 1A:
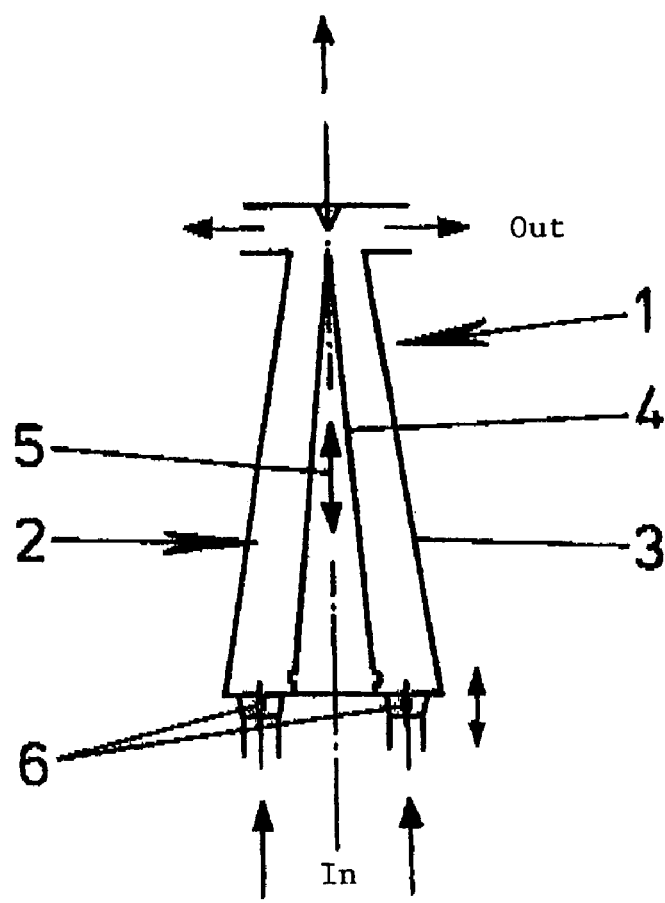

The annular gap 2 can be implemented such that, viewed in the upward direction, the cross-sections of the swirl chamber are enlarged as well as reduced (see FIGS. 1a and 1b respectively).

According to the invention, the reactor has an agglomerate separator 10 which is constructed as an annular gap opening 11 or by a plurality of offset openings on the circumference of the swirl chamber of a fluidized-bed reactor or as a discharge situated in the center of the reactor.

The openings of the agglomerate separator 10 may be situated in the conical expansion of the swirl chamber, directly at the transition between the conical expansion and a cylindrical part, in the cylindrical part of a conventional fluidized-bed reactor, at an arbitrary point of the nozzle bottom as well as at an arbitrary point of the exterior wall or of the internal cone of an annular gap reactor.

The agglomerate separator provides that agglomerates can no longer fall to the nozzle bottom inside the swirl chamber but, prior to that, are laterally diverted, for example, into an annular trough 10a. Remainders of the agglomerate which reach a nozzle bottom forming the gas inlet are withdrawn by means of a discharge in the nozzle bottom which is not shown in detail.

Figure 4:
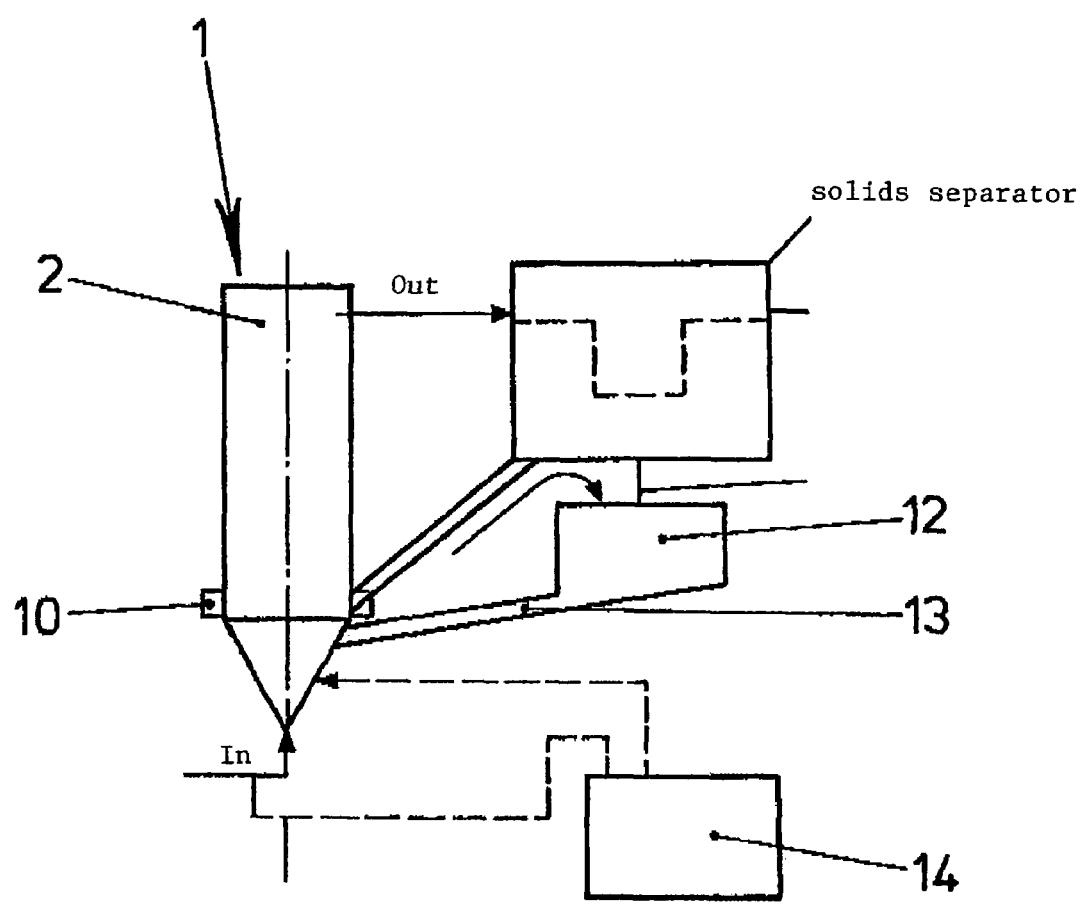
FIG. 4 is a view of a reactor according to the invention with a solids separator connected on the output side.

It is the function of the agglomerate separator to remove the backflowing agglomerates and conglomerates from the swirl chamber 2. These solids can then be charged into the fluidized bed again by means of regulated or unregulated apportioning devices. FIG. 4 illustrates such an agglomerate separator with an annular gap opening. Here, the solids are fed to a floating trough 12 from where they can then be fed again to the fluidized-bed reactor in a regulated manner (control 14), for example, distributed uniformly along the circumference by way of a pipe 13.

As a result, more stable operating conditions are established in wide load ranges which normally can be achieved only in a narrower load range (gas flow rates). The influence upon the systems connected on the input and output side by the use of an agglomerate separator is minimized.

Figure 3:
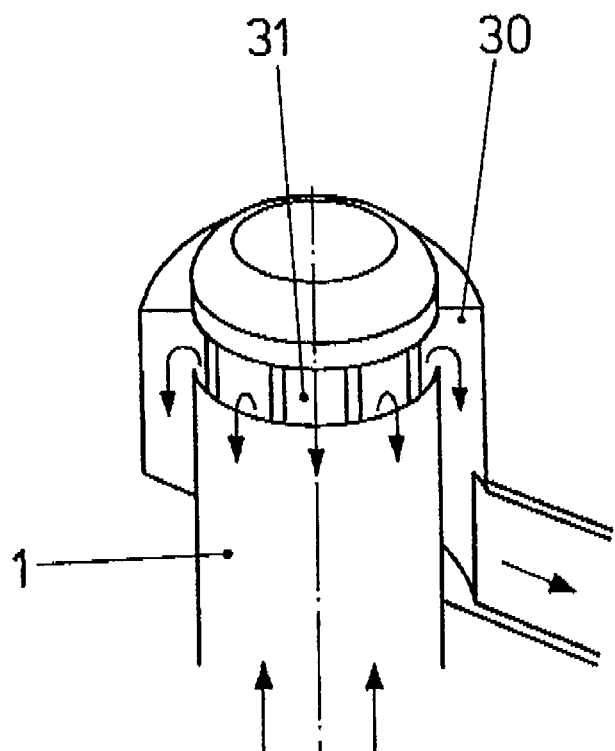
FIG. 3 is a perspective view of a gas outlet according to the invention.
Figure 2:
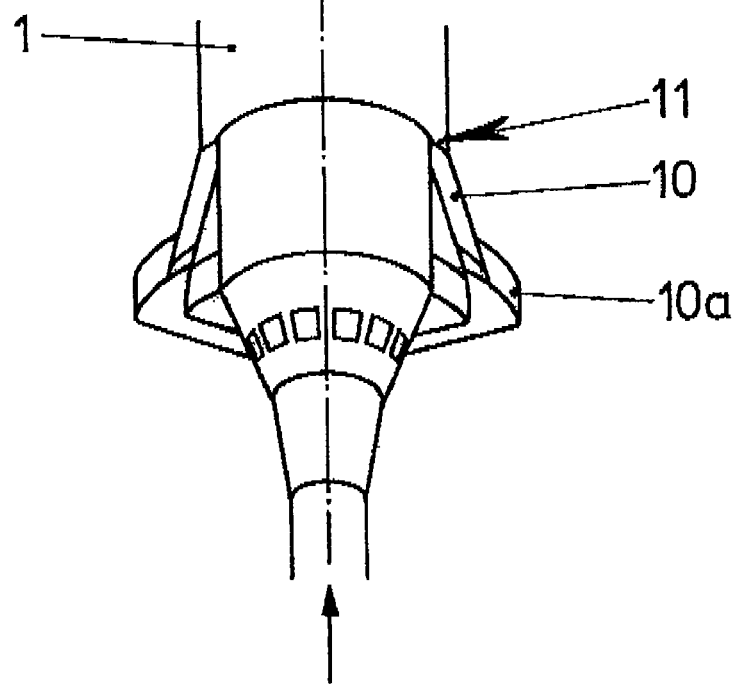
FIG. 2 is a view of the reactor according to the invention having an agglomerate separator.

FIG. 3 shows a reactor with outlet openings 30 arranged in a ring-shaped manner, which are preferably uniformly distributed on the circumference of the reactor 1, by means of which the product-laden gas is discharged in the radial direction and then, as required, in the downward direction. Solids reaching the reactor head in the core current are uniformly (radially) discharged along the shortest path and mainly in all directions. This reduces the formation of agglomerates as well as the size of the forming agglomerates. For fluidized bed processes, which, in particular, are operated with different loads (gas flow rates), the invention results in more stable operating conditions, and the influence upon the connecting systems is considerably reduced.

The constant annular gas outlet may be provided with a gas guiding cone 31 which further improves the removal of the gas/solids mixture.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Fluidized-bed reactor having a swirl chamber and a gas inlet and a gas outlet, wherein the swirl chamber is provided with inserts which permit the changing of the free cross-section such that approximately identical gas velocities are achieved at different gas flow rates or, in the case of unchanged gas flow rates, changeable gas velocities can be adjusted in the swirl chamber and/or the remainder of the reactor, wherein the gas inlet consists of a nozzle bottom in the case of which an arbitrary number of adjustable nozzles are present and wherein a discharge is situated directly above the nozzle bottom, by means of which agglomerates and solids can be discharged centrally from the swirl chamber.

2. Fluidized-bed reactor according to claim 1, wherein the swirl chamber of the reactor consists of a housing which is conical or parabolic with respect to a vertical axis and in which an insert is situated which is also conical or parabolic with respect to the vertical axis, so that, between the interior shell surface of the housing and the exterior shell surface of the insert, an annular gap is formed which forms the swirl chamber, and in that adjusting devices are provided in order to adjust the housing and the insert in the axial direction for changing the annular gap width.

3. Fluidized-bed reactor according to claim 2, wherein the gas outlet is constructed as an annular gap opening or openings distributed on the circumference, whereby the gas is discharged in a uniform manner radially from the reactor.

4. Fluidized-bed reactor according to claim 2, wherein the swirl chamber has an annular gap opening or openings arranged in a uniform manner on the circumference, which permit(s) the removal of backflowing or other solids.

5. Fluidized-bed reactor according to claim 1, having a solids separator of an arbitrary construction connected on the output side, wherein the solids separator is connected with a receptacle or a floating trough, so that the separated solids are collected there, and in that the receptacle or the floating trough is connected with the reactor, from which the solids are then removed and/or returned into the reactor.

6. Fluidized-bed reactor according to claim 5, wherein the receptacle is connected with the separator for forming a unit.

7. Fluidized-bed reactor according to claim 5, wherein the solids separator is regulated such that the differential pressure of the separator is low when the gas flow rate is low and is high when the gas flow rate is high.

8. Fluidized-bed reactor according to claim 1, wherein the outlet of the reactor has a conical insert or a conical construction.

9. Fluidized-bed reactor according to claim 1, wherein it is equipped for implementing one of the methods of:
cleaning flue gases of firing or combustion systems,
cleaning gas mixtures of any type,
burning fuels or waste within the fluidized bed,
catalytic, adsorptive and/or absorptive processing,
converting substances by the chemical reaction between the substances situated in the fluidized bed.

10. A fluidized-bed reactor; comprising:
a gas inlet;
a gas outlet; and
a swirl chamber disposed between the gas inlet and the gas outlet;
wherein the gas inlet includes a nozzle bottom where an inlet nozzle is located at the nozzle bottom, wherein an agglomerate separator is provided directly above the nozzle bottom, and wherein agglomerates are dischargeable centrally from the swirl chamber through the agglomerate separator.

11. The fluidized-bed reactor according to claim 10, wherein the agglomerate separator is an annular gap opening on a circumference of the swirl chamber.

12. The fluidized-bed reactor according to claim 10, wherein the agglomerate separator is a plurality of offset openings on a circumference of the swirl chamber.

13. The fluidized-bed reactor according to claim 10, wherein the agglomerate separator is a discharge arranged in a center of the reactor.

14. The fluidized-bed reactor according to claim 10, wherein the agglomerate separator is disposed in a conical expansion of the swirl chamber.

15. The fluidized-bed reactor according to claim 10, wherein the agglomerate separator is disposed at a transition between a conical expansion and a cylindrical part of the swirl chamber.

16. The fluidized-bed reactor according to claim 10, wherein the agglomerate separator is disposed in a cylindrical part of the swirl chamber.

17. The fluidized-bed reactor according to claim 10, further comprising an annular trough and wherein the agglomerate separator is connected to the annular trough.

18. The fluidized-bed reactor according to claim 10, further comprising an insert disposed with the swirl chamber.

* * * * *